Jan. 12, 1926.

O. C. LINTHWAITE

POLISH ROD CLAMP

Filed March 7, 1925    2 Sheets-Sheet 1

1,569,327

INVENTOR.
Owen C. Linthwaite
BY
ATTORNEYS.

Jan. 12, 1926.  
O. C. LINTHWAITE  
POLISH ROD CLAMP  
Filed March 7, 1925

1,569,327

2 Sheets-Sheet 2

INVENTOR.  
Owen C. Linthwaite  
BY Nestall and Wallace  
ATTORNEYS.

Patented Jan. 12, 1926.

1,569,327

UNITED STATES PATENT OFFICE.

OWEN C. LINTHWAITE, OF LOS ANGELES, CALIFORNIA.

POLISH-ROD CLAMP.

Application filed March 7, 1925. Serial No. 13,935.

*To all whom it may concern:*

Be it known that I, OWEN C. LINTHWAITE, citizen of the United States, and resident of Los Angeles, in the county of Los Angeles, State of California, have invented new and useful Improvements in Polish-Rod Clamps, of which the following is a specification.

This invention relates to a clamp adapted to securely hold devices such as polish rods and the like, hereafter called "the work." Broadly, it pertains to a clamp having a divided work embracing unit which may be clamped about the work and then adjusted so as to bind against and frictionally hold the latter.

The primary object of this invention is to provide a device of the character described having means for exerting pressure upon the members of the embracing unit, which means consists of articulated linkage. In addition to the broader objects of this invention, there are certain details of structure, whereby a simple, strong, durable, easily manipulated structure is obtained.

In the accompanying drawing, two embodiments of the invention are illustrated.

Figure 1:
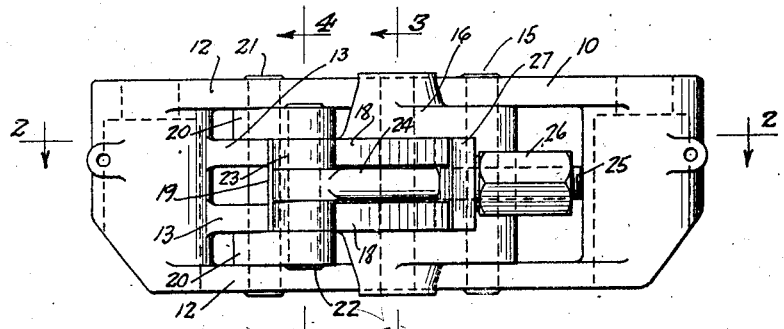
Figure 2:
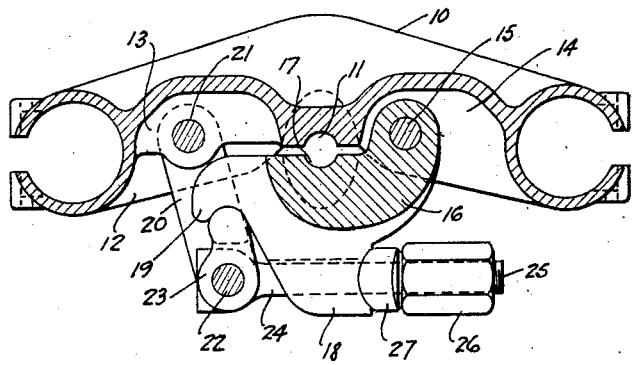
Figure 3:
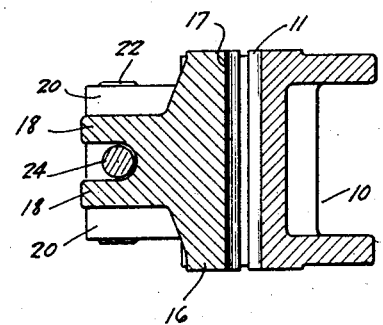
Figure 4:
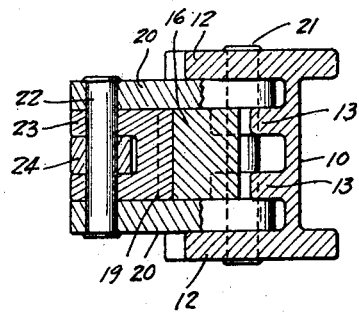
Figure 5:
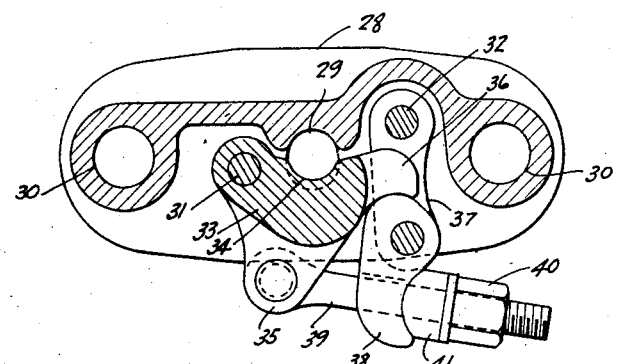
Figure 6:
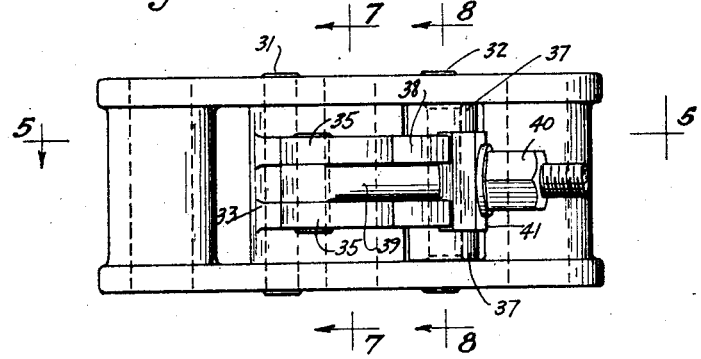
Figure 7:
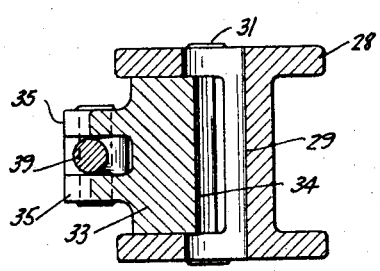
Figure 8:
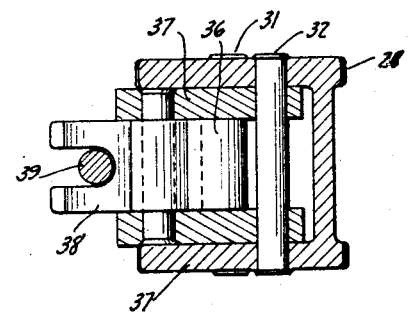

Fig. 1 is a face view of one form of clamp embodying my invention; Fig. 2 is a section as seen on the line 2—2 of Fig. 1; Fig. 3 is a section as seen on the line 3—3 of Fig. 1; Fig. 4 is a section as seen on the line 4—4 of Fig. 1; Fig. 5 is a horizontal section through another form of clamp embodying the invention as seen on the line 5—5 of Fig. 6; Fig. 6 is a front elevation of the clamp shown in Fig. 5; Fig. 7 is a section as seen on the line 7—7 of Fig. 6; and Fig. 8 is a section as seen on the line 8—8 of Fig. 6.

Referring more particularly to Figs. 1 to 4, inclusive, an embracing member is indicated by 10. In the specific form shown, this embracing member is a body provided at the center thereof with a longitudinally extending channel 11 substantially semi-cylindrical in shape. This channel is located substantially at the median plane of the body. At the end of the body are sockets to receive the suspension tackle. Spaced transverse ribs 12 serve as a support for a locking link pin. Auxiliary ribs 13 add to the strength in supporting the link 10. Ribs 14 similar to ribs 12 are disposed on the opposite side of channel 11 and serve to support a hinge pin 15 for the other embracing member also termed a door. A hinge pin has mounted thereon a door 16. Door 16 has a channel 17 arranged to be registered with channel 11 in the body to form a recess for receiving the polish rod. Projecting outwardly from the door is a bifurcated lug having spaced ears 18 adapted to receive a link therebetween. On the end of the door is a lip 19. A pair of links 20 connected by an articulation forming a knuckle are pivotally mounted upon a pin 21, which is secured in the ribs 12 and 13. Mounted in the ends of links 20 is a pin 22, upon which is mounted a lock rocker 23 having a rounded end adapted to be disposed and fit in the recess formed by lip 19 on the door. Also pivotally mounted upon the pin 22 is a pull rod 24 threaded at one end as indicated by 25 and adapted to receive a tightening nut 26. Nut 26 engages a washer 27 adapted to seat in a recess in the bifurcation 18 on the door.

In Figs. 1 to 4, the door is shown in closed position. In order to open the door, nut 26 is backed up so that washer 27 may be moved and the pull rod 24 outwardly away from the bifurcation, the washer 27 clearing the door. The links 20 may then be swung away from the lip 19, the rocker 23 clearing the lip. The door is then free to be swung open and the work is thereby released. The reverse operation is followed in closing the door upon the work. By tightening nut 26 upon the pull rod, pressure is brought to bear upon the bifurcated portion 18 of the door tending to close the latter. Links 20 are swung inwardly toward the door by reason of the pull rod acting upon them, the rocker 23 is moved, the pivotal axis thereof being on a radius of curvature such as to cause the rocker to be moved inwardly and pressed against the lip 19, thereby exerting pressure upon the door.

Referring more particularly to Figs. 5 to 8, the clamp comprises an embracing member or body 28 having a semi-cylindrical channel 29 at the center thereof and sockets 30 for suspension tackle at the ends thereof. Mounted in the body at one side of the channel is a hinge pin 31 for pivotal attachment thereto of the door. Inset in the body on the other side is a pin 32 for the locking link.

A door 33 is pivotally mounted upon the hinge pin 31. A channel of semi-cylindrical form indicated by 34 is arranged to be registered with channel 29 in the body, this providing a space to receive the polish rod. Spaced ears 35 extend from the door and are arranged to pivotally receive a pull rod. A lip 36 projects from the door.

Pivotally mounted upon pin 32 are links 37 arranged to receive the lip 36 therebetween. Pivotally secured to the links 37 is a bifurcated rocker 38 having a rounded end adapted to be engaged with the lip 36 as best shown in Fig. 5. Pivotally secured to the ears 35 is a pull rod 39. This rod is threaded at the end to receive a nut 40, and mounted between the nut and rocker 38 is a washer 41.

As shown in Figs. 5 to 8 inclusive, the parts are in position to grip a polish rod. Tightening of nut 40 will cause pressure to be exerted upon rocker 38 tending to turn the latter. The surface of rocker 38 in contact with lip 36 is in the nature of a cam surface, and the high spot is swung into engagement with the lips 36, thereby forcing the door 33 inwardly against the work. A pull through the rod 39 is also exerted upon the door through the ears 35 tending to close the door against the work. The result is that a very great pressure is brought to bear against any work which may be gripped between the door and body. To release the work, nut 40 is backed up so that washer 41 may be positioned to clear the rocker 38. The pull rod 39 is then swung outwardly out of engagement with rocker 38, the latter turned to relieve any pressure upon the lip 36 on the door, and the links 37 and rocker 38 swung away from it so as to clear the latter, thereby permitting the door to be swung open.

What I claim is:

1. A clamp of the character described comprising a plurality of members hingedly secured to each other so as to form a divided work embracing unit, articulated locking means for drawing said members together extending between the latter, means to effectively expand and contract said locking means, and a rocker at the knuckle of said articulated means arranged to bear upon one of said members and exert closing pressure thereon upon contraction of said locking means.

2. A clamp of the character described comprising a plurality of members hingedly secured to each other so as to form a divided work embracing unit, articulated locking means for drawing the members together extending between the latter at the opening therebetween, means to effectively expand and contract said locking means whereby to exert closing pressure thereon, and a rocker secured to the locking means and engageable with one of said members whereby pressure upon said locking means tending to straighten it will press said rocker against said last mentioned member.

3. A clamp of the character described comprising a plurality of members hingedly secured to each other so as to form a divided work embracing unit, articulated locking means for drawing said members together extending between the latter and having a knuckle adjacent the opening therebetween, means to effectively expand and contract said locking means, and a rocker pivotally mounted on said locking means and arranged so as to bear upon one of said members and exert closing pressure thereon upon contraction of said locking means, said rocker being arranged to be swung pivotally by closing movement of said locking means and thereby exert the pressure thereon.

4. A clamp of the character described comprising a body member, a door member hingedly secured to said body member so as to form a divided work embracing unit, said door member having a lip at the free end thereof, articulated locking means for drawing the members together extending between the latter at the opening therebetween, means to effectively expand and contract said locking means whereby to exert closing pressure thereon, a rocker secured to the locking means and engageable with said lip whereby pressure upon said locking means tending to straighten it will press said rocker against said lip.

5. A clamp of the character described comprising a body member, a door member hingedly secured to said body member so as to form a divided work embracing unit, said door member having a lip at the free end thereof, articulated locking means for drawing the members together extending between the latter at the opening therebetween, means to effectively expand and contract said locking means whereby to exert closing pressure thereon, a rocker pivotally mounted on said locking means and so arranged as to bear upon said lip and exert closing pressure thereon upon contraction of said locking means and to be swung pivotally by contraction of said locking means and thereby further exert pressure thereon.

6. In a clamp of the character described, a body member, a door member hingedly secured to said body member so as to form a divided work embracing unit, said door members having a lip at the free end thereof, articulated locking means for drawing the members together comprising a link pivotally secured to said body and a pull rod pivotally secured to said link, means on said pull rod to secure the latter to said door member and to adjustably pull upon said rod to effectively expand and contract said locking means whereby to exert closing pressure thereon, a rocker secured to the locking means and engageable with said lip whereby pressure upon said locking means tending to straighten it will press said rocker against said lip.

7. In a clamp of the character described, a body member, a door member hingedly secured to said body member so as to form a divided work embracing unit, said door member having a lip at the free end thereof, articulated locking means for drawing the members together comprising a link pivotally secured to the body and a pull rod pivotally secured to said link, means on said pull rod to secure the latter to said door member and adjustably pull upon said rod so as to effectively expand and contract said locking means whereby to exert closing pressure thereon, a rocker pivotally mounted on said locking member at the knuckle thereof and so arranged as to bear upon said lip and exert closing pressure thereon upon contraction of said locking means, said rocker being arranged to be swung pivotally by closing movement of said locking means and thereby further exert pressure upon said lip.

8. In a clamp of the character described, a body member, a door member hingedly secured to said body member so as to form a divided work embracing unit, said door member having a lip at the free end thereof, a link member pivotally secured to the body, a pull rod pivotally secured to said link so as to form an articulated locking means, the end of said rod being threaded, a projection on said door adapted to embrace said rod, a nut upon said rod for engaging said projection, whereby to effectively expand and contract said locking means and exert closing pressure upon said door member, a rocker secured to the locking member at the knuckle and engageable with said lip whereby pressure upon said locking means tending to straighten it will press said rocker against said lip.

9. In a clamp of the character described, a body member, a door member secured to said body member so as to form a divided work embracing unit, said door member having a lip at the free end thereof, a link pivotally secured to the body, a pull rod pivotally secured to said link and forming therewith an articulated locking means, the end of said pull rod being threaded, said door having a projection to embrace said pull rod, a nut mounted upon the threaded end of said pull rod and engageable with said projection so as to effectively expand and contract said locking means whereby to exert closing pressure thereon, a rocker pivotally mounted on said locking means at the knuckle and so arranged as to bear upon said lip, said rocker being arranged to be swung pivotally by a closing movement of said locking means and thereby further exert pressure upon said lip.

In witness that I claim the foregoing I have hereunto subscribed my name this 18th day of February, 1925.

OWEN C. LINTHWAITE.